United States Patent
Dar et al.

(10) Patent No.: US 10,609,525 B1
(45) Date of Patent: Mar. 31, 2020

(54) ALERT MESSAGE TRANSLATION FOR MESSAGE FORWARDING ON LEGACY NETWORK

(71) Applicant: T-Mobile USA, Inc., Bellevue, WA (US)

(72) Inventors: Sheraz Dar, Maple Valley, WA (US); Zakir Hussain Syed, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/675,118

(22) Filed: Nov. 5, 2019

Related U.S. Application Data

(62) Division of application No. 16/228,603, filed on Dec. 20, 2018, now Pat. No. 10,499,206.

(51) Int. Cl.
 *H04W 4/14* (2009.01)
 *H04W 4/20* (2018.01)
 *H04L 29/12* (2006.01)

(52) U.S. Cl.
 CPC ........... *H04W 4/14* (2013.01); *H04L 61/2007* (2013.01); *H04W 4/20* (2013.01)

(58) Field of Classification Search
 None
 See application file for complete search history.

(56) References Cited

U.S. PATENT DOCUMENTS

| 9,451,427 | B1 | 9/2016 | Hoelzle et al. |
| 2006/0276226 | A1 | 12/2006 | Jiang |
| 2009/0129372 | A1 | 5/2009 | Pandey et al. |
| 2012/0149326 | A1 | 6/2012 | Zhang et al. |
| 2018/0007198 | A1* | 1/2018 | Rabra ............... H04M 15/8351 |

OTHER PUBLICATIONS

Office Action for U.S. Appl. No. 16/228,603, dated Apr. 4, 2019, Dar, "Alert Message Translation for Message Forwarding on Legacy Network", 10 pages.
Office Action for U.S. Appl. No. 16/228,603, dated Jun. 25, 2019, Dar, "Alert Message Translation for Message Forwarding on Legacy Network", 16 pages.

* cited by examiner

*Primary Examiner* — Suhail Khan
(74) *Attorney, Agent, or Firm* — Lee & Hayes, P.C.

(57) ABSTRACT

When a message server of an Internet Protocol (IP) network, such as a Rich Communication Services (RCS) server, receives a message addressed to a destination identifier, but cannot immediately forward the message on to a terminating communication device associated with the destination identifier, the message server can store the message in a message database. When a communication device associated with the destination identifier connects to a legacy network, a Short Message Service Center (SMSC) of the legacy network can send the message server a Short Message Peer-to-Peer (SMPP) message with a predefined alert indicator signaling that the communication device is available to receive messages through the legacy network. The message server can accordingly retrieve the stored message from the message database and send the message to the communication device through the legacy network.

20 Claims, 7 Drawing Sheets

ALERT MESSAGE TRANSLATION FOR MESSAGE FORWARDING ON LEGACY NETWORK

PRIORITY

The present application is a divisional of, and claims priority to, U.S. patent application Ser. No. 16/228,603, filed on Dec. 20, 2018, entitled "ALERT MESSAGE TRANSLATION FOR MESSAGE FORWARDING ON LEGACY NETWORK," the entirety of which is incorporated herein by reference.

BACKGROUND

It has become common for users of mobile devices to send messages over wireless networks to other mobile devices. Such messages include text messages sent as Short Message Service (SMS) messages. Some types of messages, such as Multimedia Messaging Service (MMS) messages, also allow other types of media to be sent instead of or in addition to text, such as images, audio, and video.

Messaging standards have advanced to provide additional features beyond simply sending messages. For example, GSMA's Rich Communication Services (RCS) standard can allow devices to be informed when sent messages have been received, as well as when users are drafting reply messages on other devices. RCS also supports other advanced features, including group chat, file transfers, and content sharing.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example architecture of a message server.

DETAILED DESCRIPTION

Introduction

Figure 1:
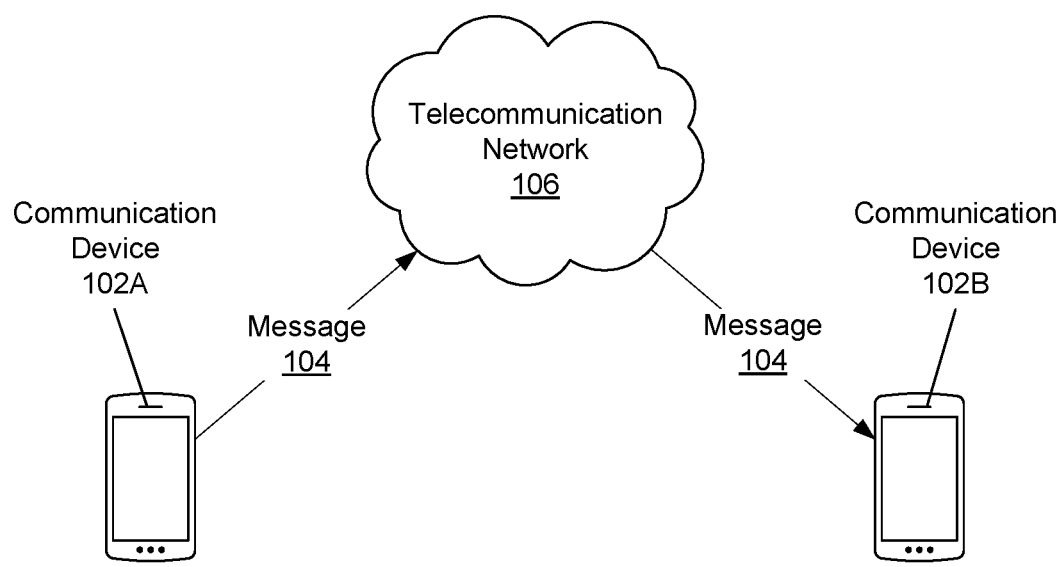
FIG. 1 depicts a messaging environment in which communication devices can send and receive messages through a telecommunication network.

Wireless networks are often used to send messages between communication devices. Such messages include text messages. Such messages can also include multimedia messages that include images, video, audio, and/or other types of media instead of, or in addition to, text.

Protocols used to transport messages have developed over time as wireless networks have changed. Older wireless networks, such as Global System for Mobile Communications (GSM) networks, use Signaling System No. 7 (SS7) protocols to exchange information between network elements. In such SS7-based networks, messages can be sent between network elements using an SS7 protocol known as Mobile Application Part (MAP). More recent wireless networks, such as Long-Term Evolution (LTE) and 5G networks, are based on the Internet Protocol (IP). Such IP-based networks can use a protocol known as Session Initiation Protocol (SIP) to send messages and other information between network elements.

Transport of some types of messages, including Short Message Service (SMS) text messages and Multimedia Messaging Service (MMS) messages, can be sent over wireless networks that are based on either SS7 or IP. However, newer messaging standards have been developed that rely on IP-based communications to provide more advanced messaging features relative to SMS and MMS. For example, the Rich Communication Services (RCS) protocol can use information exchanged via SIP to provide read receipts when sent messages have been read on a recipient communication device, provide indications to other communication devices that new messages are being drafted before they are sent, and provide other advanced messaging features including group chat, file transfers, and content sharing.

To implement such RCS features, an IP-based network can have an RCS server that exchanges SIP messages with communication devices. For instance, the RCS server can use SIP messages to track and/or obtain information about individual communication devices, including which devices are connected, what capabilities they support, and what messaging actions they are performing or have performed. An individual message, such as an RCS message, sent by an originating communication device can also be encapsulated into a SIP message for transport, which the RCS server can receive and forward to one or more terminating communication devices.

A message server of an IP-based network, such as an RCS server, can identify individual communication devices at least in part by identifiers tied to individual subscriptions. Accordingly, messages intended for a particular subscriber can be delivered to a communication device associated with that subscriber, even if the subscriber switches to a different communication device. For example, a communication device can have a subscriber identity module (SIM) associated with a Mobile Station International Subscriber Directory Number (MSISDN), a phone number tied to the subscriber's account. This can allow a subscriber to move a SIM from a first communication device to a second communication device in order to transfer an associated MSISDN to the second communication device. SIP messages can be used to inform the message server that the MSISDN is now associated with the second communication device, so that the subscriber can continue sending and receiving messages tied to that MSISDN on the second communication device.

When messages are not deliverable to a communication device associated with an MSISDN, such as if a subscriber is in the process of swapping an associated SIM to a different communication device or if a communication device is not connected to the wireless network, the message server can store the messages in a message database. Once the message server determines that a communication device associated with the MSISDN is again able to receive messages, the message server can retrieve the stored messages from the message database and forward them to the communication device. If the message server is an RCS server that stored RCS messages for an MSISDN and the MSISDN has been associated with a new communication device that does not support RCS, the stored RCS messages can be converted to SMS or another format supported by the new communication device.

However, in conventional systems an RCS server or other message server may not be notified in some situations that an MSISDN has been associated with a new communication device. Accordingly, any messages stored for that MSISDN may remain in the message database and never be forwarded on to the new communication device.

For example, two communication devices may be engaged in an RCS messaging session when both communication devices are connected to an IP-based wireless network. However, if one of the communication devices associated with a particular MSISDN is taken offline and its SIM is swapped to another communication device that is only compatible with SS7-based wireless networks, an RCS server may store any RCS messages for that particular MSISDN in its message database. Although the MSISDN can now be associated with the new SS7-compatible communication device due to the SIM swap, the SS7-compatible communication device may only support MAP and be unable to use SIP to inform the RCS server that it is now available to receive messages stored for it in the RCS server's database. Accordingly, although the new communication device is connected, in conventional systems it may never receive the stored messages.

Described herein are systems and methods that can inform a message server of an IP network when an MSISDN becomes associated with a communication device connected to a legacy SS7 wireless network. In response, the message server of the IP network can retrieve any stored messages for that MSISDN and forward the messages through the legacy wireless network to the communication device.

Example Environments

FIG. 1 depicts a messaging environment in which in which communication devices 102 can send and receive messages 104 through a telecommunication network 106.

A communication device 102 can be any device that can wirelessly connect to the telecommunication network 106 and engage in sending and/or receiving messages 104. For example, a communication device 102 can be a smart phone, a cellular phone, a personal digital assistant (PDA), a personal computer (PC), a laptop, a desktop, a workstation, a media player, a tablet, a gaming device, a smart watch, or any other type of computing or communication device. A communication device 102 can also be referred to as user equipment (UE), a mobile device, or a mobile station (MS).

Elements of the telecommunication network 106 can be based on one or more wireless access technologies and/or provide communications and network access to communication devices 102 through one or more wireless access technologies. For example, wireless access technologies can include fifth generation (5G) technology, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, and WiFi® technology.

A message 104 can be a message sent from an originating communication device 102 to one or more terminating communication devices 102. A message 104 can include text and/or other media. In some examples, a message 104 can be a Short Message Service (SMS) text message. In other examples, a message can be a Multimedia Messaging Service (MMS) message that can include text and/or other types of media, such as images, audio, and video. In still other examples, a message 104 can be a Rich Communication Services (RCS) message. As will be described further below, RCS can provide more advanced messaging features relative to other protocols such as SMS and MMS.

In some situations, the telecommunication network 106 can inform an originating communication device 102 when a terminating communication device 102 does not support RCS, such that the originating communication device 102 can send a message 104 to the terminating communication device 102 using SMS or MMS instead of RCS. In other situations, the telecommunication network 106 can convert a message 104 from RCS to another format such as SMS or MMS if a terminating communication device 102 does not support RCS.

Figure 2:
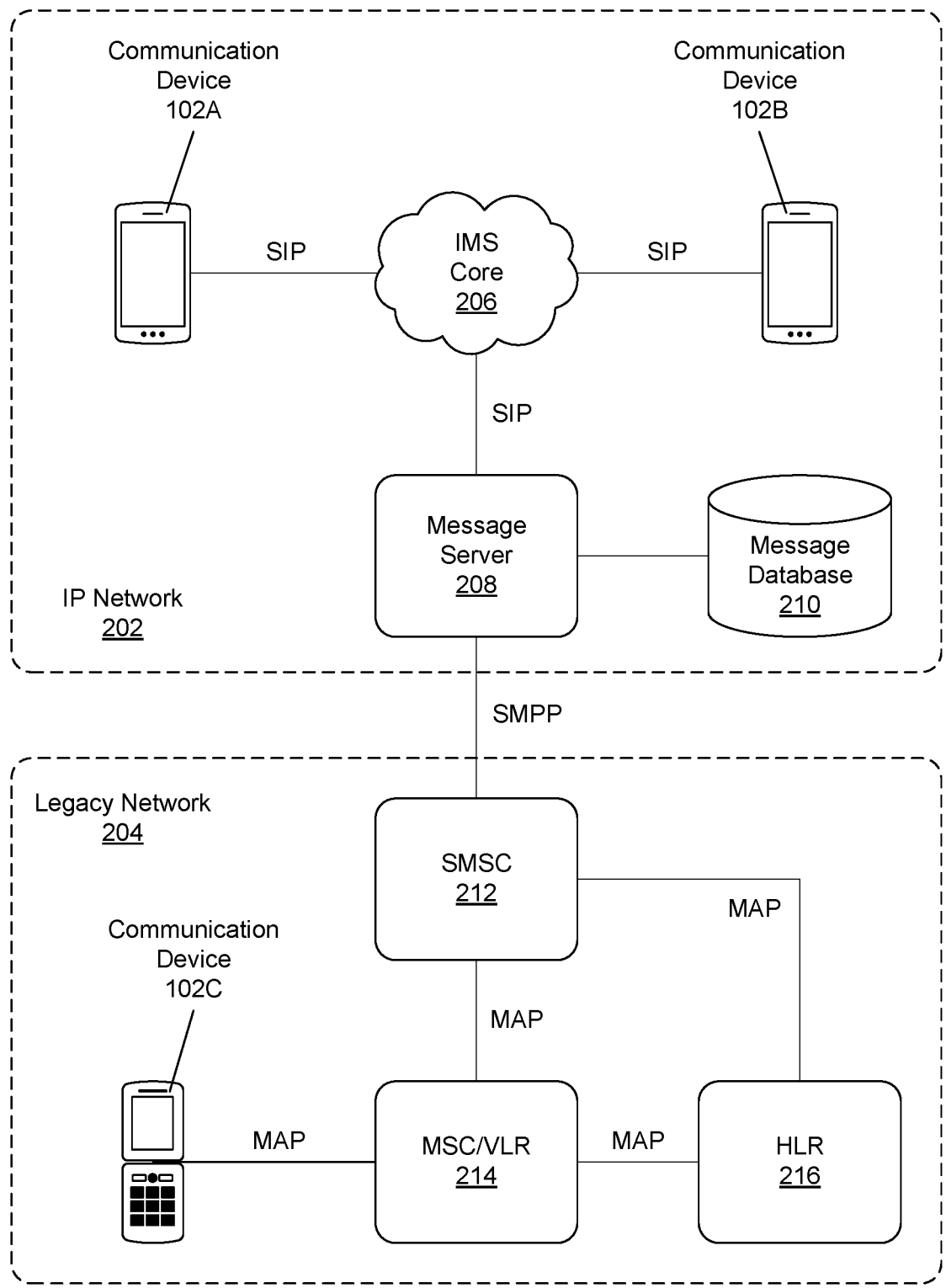
FIG. 2 depicts a telecommunication network that includes both an Internet Protocol (IP) network and a legacy network.

FIG. 2 depicts a telecommunication network 106 that includes both an Internet Protocol (IP) network 202 and a legacy network 204. In some examples, the IP network 202 can be a newer network such as an LTE or 5G network, while the legacy network 204 can be an older network such as a GSM network. An operator can choose to maintain a legacy network 204 in addition to an IP network 202 for many reasons, including maintaining compatibility with older communication devices 102. For example, communication devices 102A and 102B shown in FIG. 2 may be newer smartphones configured to connect to an LTE network, while communication device 102C may be an older cellular phone that is only compatible with GSM networks.

Elements of the IP network 202 can exchange information using IP-based communications. For example, some elements of the IP network 202 can use Session Initiation Protocol (SIP) messages to exchange information. For example, a message 104 sent by an originating communication device 102 can be encapsulated into a SIP message for transport through the IP network 202. The IP network 202 can include an IP Multimedia Subsystem (IMS) core 206, a message server 208, a message database 210. Additional network elements may also be present in the IP network 202, but are omitted from FIG. 2 for brevity.

The IMS core 206 can contain network elements that can process and/or route SIP messages in the IP network 202. For example, the IMS core 206 can include one or more Call Session Control Functions (CSCFs) that process SIP messages, including Proxy CSCFs (P-CSCFs), Interrogating-CSCFs (I-CSCFs), and/or Serving-CSCFs (S-CSCFs). The IMS core 206 can also have, or be linked to, one or more application servers that provide services for communication sessions. As discussed below, the message server 208 can be one of these application servers that assists in implementing messaging sessions for communication devices 102.

Communication devices 102 compatible with the IP network 202, such as communication devices 102A and 102B shown in FIG. 2, can connect to the IMS core 206 via an access network not shown in FIG. 2. For example, a compatible communication device 102 can wirelessly connect to a base station, such as an LTE eNode B. The base station can be connected to a core network, such as LTE Evolved Packet Core (EPC). The core network can also be linked to the IMS core 206. Accordingly, the communication device 102 can reach the IMS core 206 via the base station and the core network.

The message server 208 can be an application server linked to one or more elements of the IMS core 206. The message server 208 can set up and/or manage messaging sessions between communication devices 102, including receiving and forwarding messages 104. In some examples, the message server 208 can be an RCS server that can receive and forward RCS messages 104 encapsulated in SIP messages, as well as providing other advanced RCS messaging features. For example, the RCS server can obtain and maintain status information about individual communication devices 102 and/or messaging sessions, including tracking which communication devices 102 are available and are RCS-compatible. This can allow the RCS server to provide communication devices 102 with read receipts, notifications of messages 104 that are being prepared but have not yet been sent, and other RCS features. In some examples, the message server 208 can also process other types of messages 104, such as SMS and MMS messages, and/or convert RCS messages to SMS or MMS messages if a terminating communication device 102 does not support RCS.

SIP messages can be used to exchange information between compatible communication devices 102, the IMS core 206, the message server 208, and/or other elements of the IP network 202. Some of these SIP messages can encapsulate messages 104 being sent to or from communication devices 102. However, other SIP messages can be used to implement other advanced RCS messaging features via the message server 208. For example, a communication device 102 can provide SIP messages to the message server 208 to indicate that it is compatible with RCS, that a message 104 has been successfully received, that a user is typing a new message 104 that has not yet been sent, and/or to indicate other types of information associated with RCS features. The message server 208, such as an RCS server, can also send SIP messages to a communication device 102, such as a polling message requesting information about the communication device's capabilities or its presence information, or informing the communication device 102 that a message 104 has been received or is in the process of being drafted on another communication device 102.

The message server 208 can track communication devices 102 and exchange SIP messages with communication devices 102 based on identifiers linked to specific subscriber accounts. For example, the message server 208 can identify communication devices 102 based on Mobile Station International Subscriber Directory Numbers (MSISDNs) associated with the communication devices 102. An MSISDN can be stored in a subscriber identity module (SIM), and the SIM can be associated with a communication device 102 and/or moved between communication devices 102. Accordingly, a user can associate an MSISDN with a new communication device 102 by swapping an associated SIM from another communication device 102 to that new communication device 102. When the message server 208 receives a new message 104 for a particular MSISDN, the message server 208 can determine if it is aware of a currently connected communication device 102 that is associated with that MSISDN, and if so forward the message 104 to that communication device 102.

The message server 208 can have, or be in communication with, a message database 210. The message database 210 can store messages 104 that the message server 208 is not able to forward to a terminating communication device 102. For example, when presence information tracked by the message server 208 indicates that a communication device 102 associated with an MSISDN is not online and one or more new messages 104 are received for that MSISDN, the message server 208 can store the new messages 104 in the message database 210 in conjunction with the MSISDN. Once the message server 208 receives information, such as new presence information, indicating that a communication device 102 associated with the MSISDN has come online, the message server 208 can retrieve the one or more stored messages 104 from the message database 210 and forward the messages 104 on to the communication device 102. The message server 208 is thus able to provide "store and forward" functionality for messages 104 that cannot initially be delivered.

In some examples, the message server 208 can use HTTP request methods, such as GET or POST requests to transfer messages 104 to and from the message database 210. In other examples, FTP or any other data transfer type or protocol can be used to store and retrieve messages 104 in the message database 210.

While elements of the IP network 202 can exchange information natively using IP-based communications, elements of the legacy network 204 can exchange information using other types of protocols, such as Signaling System No. 7 (SS7) protocols. For example, some elements of the legacy network 204 can use Mobile Application Part (MAP) messages to exchange information. In some examples, elements of the legacy network 204 can use Signaling Transport (SIGTRAN), an extension of SS7, to carry MAP messages and other SS7 signaling over IP. Some types of messages 104, such as SMS messages, can be encapsulated into MAP messages.

The legacy network 204 can include a Short Message Service Center (SMSC) 212, a Mobile Switching Center (MSC)/Visitor Location Register (VLR) 214, and a Home Location Register (HLR) 216. Additional network elements may also be present in the legacy network 204, but are omitted from FIG. 2 for brevity. For example, compatible communication devices 102 can connect to the legacy network 204 by wirelessly connecting to a base station not shown in FIG. 2, such as a base station subsystem (BSS) of a GSM network, that is linked to an MSC/VLR 214.

The SMSC 212 can be an element in the legacy network 204 that is configured to process and/or forward messages 104. For example, an SMSC 212 can use MAP to route SMS messages 104 to or from communication devices 102 connected to the legacy network 204.

The MSC/VLR 214 can be an element in the legacy network 204 that includes an MSC that routes communications for connected communication devices 102. The MSC/VLR 214 can also include a VLR that includes a database identifying which communication devices 102 are being served by the associated MSC, based at least in part on the MSISDNs associated with the communication devices 102. Although FIG. 2 shows an MSC and a VLR integrated into a single MSC/VLR 214, in other examples an MSC and a VLR can be separate network elements. In some examples, an MSC can alternately be referred to as a Mobile Switching Center Server (MSS).

The HLR 216 can be a network element that includes a database identifying which MSC/VLRs 214 are servicing individual communication devices 102, based at least in part on the MSISDNs associated with the communication devices 102. When information is to be sent to a particular communication device 102, elements of the legacy network 204 can determine from the HLR 216 which MSC/VLR 214 is serving that communication device 102, and send the communication to that serving MSC/VLR 214. When a communication device 102 connects to an MSC/VLR 214, the MSC/VLR 214 can use a MAP message to inform the HLR 216 that the communication device 102 has connected, and the HLR 216 can update its database to associate the communication device 102 with the MSC/VLR 214.

As discussed above, elements of the legacy network 204 can use SS7 or SIGTRAN to transmit MAP messages to exchange information. In contrast, elements of the IP network 202 can use IP-based SIP messages to exchange information. Although the message server 208, such as an RCS server, is in the IP network 202 and the SMSC 212 is in the legacy network 204, the message server 208 can communicate with the SMSC 212 using a different protocol known as the Short Message Peer-to-Peer (SMPP) protocol.

When an originating communication device 102 connected to the legacy network 204 sends a message 104, such as an SMS message, to a terminating communication device 102 connected to the IP network 202, the message 104 can be encapsulated into a MAP message that can be routed through the legacy network 204 to the SMSC 212. The SMSC 212 can interwork the message 104 from being encapsulated in a MAP message to being encapsulated into an SMPP message, and send the SMPP message to the message server 208. The message server 208 can then interwork the message 104 from being encapsulated in the SMPP message to being encapsulated in a SIP message, and use SIP to send the message 104 on to the terminating communication device 102 through the IMS core 206.

Similarly, when an originating communication device 102 connected to the IP network 202 sends a message 104, such as an RCS message or SMS message, to a terminating communication device 102 connected to the legacy network 204, the message 104 can be encapsulated in a SIP message that can be routed through the IP network 202 to the message server 208. The SMSC 212 can interwork the message 104 from being encapsulated in the SIP message to being encapsulated in an SMPP message, possibly converting the underlying message 104 from an RCS message to another format such as SMS if necessary. The message server 208 can then send the SMPP message to the SMSC 212. The SMSC 212 can then interwork the message 104 from being encapsulated in the SMPP message to being encapsulated in a MAP message, and use MAP to send the message 104 on to the terminating communication device 102 through the legacy network 204.

As discussed above, in some situations the message server 208 can store a message 104 addressed to a particular MSISDN in its message database 210 when the message 104 is initially undeliverable. For example, when the message 104 is an RCS message sent to an MSIDSN associated with an RCS-compatible communication device 102, but the RCS-compatible communication device 102 has gone offline, the message 104 can be stored in the message database until the RCS server 208 is notified that a communication device 102 associated with the MSISDN is again available. When a communication device 102 associated with the MSISDN is later connected through the IP network 202, it can send a SIP message to the message server 208 indicating that it is available, and the message server 208 can retrieve stored messages 104 from the message database 210 and forward them to the communication device 102. However, when a communication device 102 associated with the MSISDN is later connected through the legacy network 204 and cannot send such a SIP message to the message server 208 indicating that it is available, the sequence shown in FIG. 3 can be used to inform the message server 208 that the communication device 102 is connected and able to receive stored messages 104.

Figure 3:
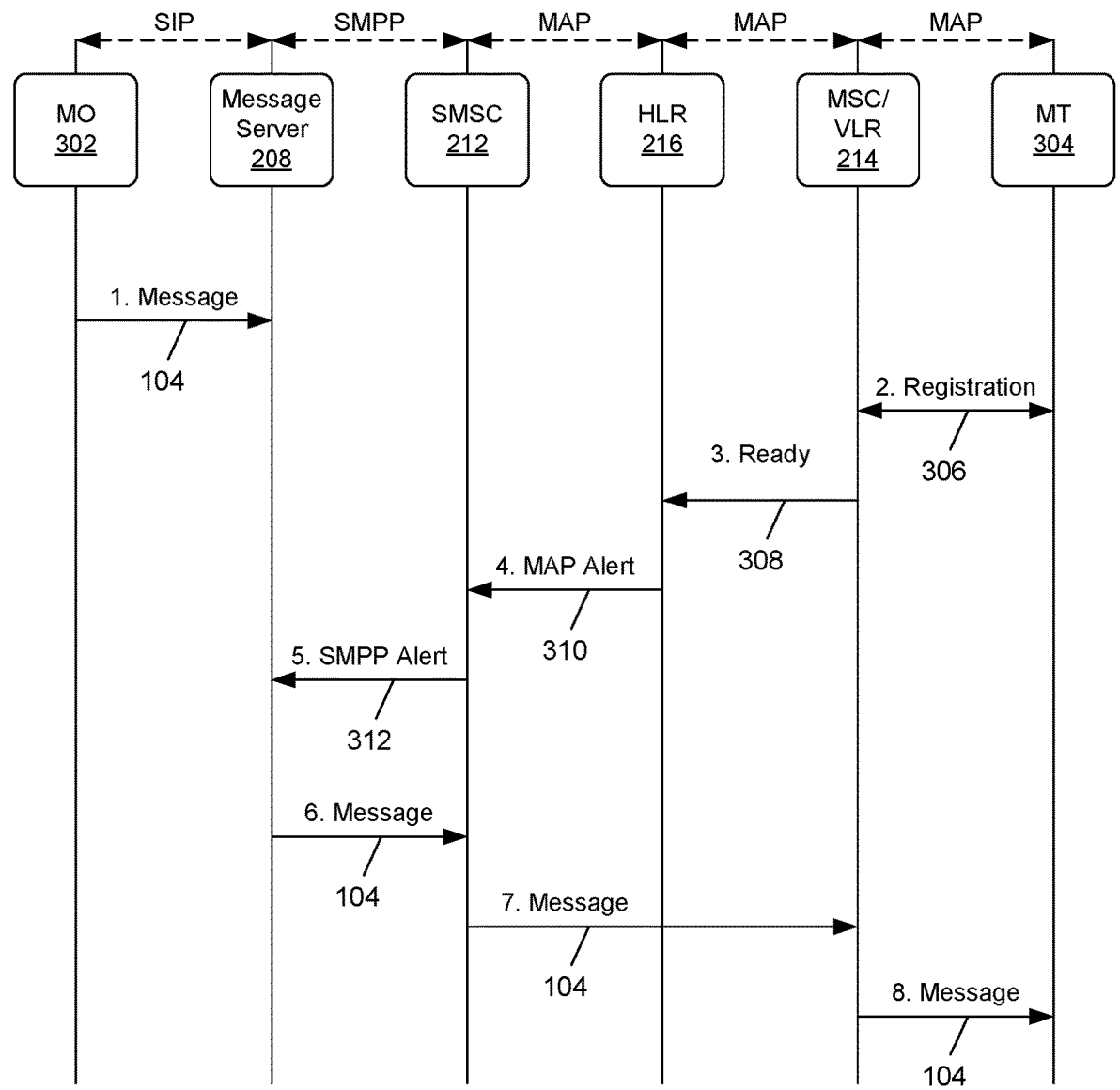
FIG. 3 depicts a sequence diagram of operations that can be used to inform a message server of an IP network that a communication device associated with an MSISDN is connected to a legacy network and is able to receive messages stored for that MSISDN.

FIG. 3 depicts a sequence diagram of operations that can be used to inform a message server 208 that a communication device 102 associated with an MSISDN is connected to a legacy network 204 and is able to receive messages 104 stored for that MSISDN. In FIG. 3, an originating communication device 102 that sends a message 104 is referred to as a Mobile Originating (MO) device 302, while a terminating communication device 102 to which the message 104 is ultimately delivered is referred to as a Mobile Terminating (MT) device 304.

As shown in FIG. 3, at operation 1 a message 104 from an MO 302 addressed to an MSISDN can be sent through the IP network 202 to the message server 208 using SIP. In some examples, this message 104 may be part of an RCS messaging session between the MO 302 and another RCS-compatible communication device 102 that is associated with the MSISDN. However, at the time the message server 208 receives the message 104, the message server 208 may be unable to locate the RCS-compatible communication device 102 associated with the MSISDN. For example, while the RCS-compatible communication device 102 associated with the MSISDN may have previously used SIP to provide presence information to a message server 208, such as an RCS server, indicating that it was connected and available to receive messages 104, the message server 208 may not be able to reach the RCS-compatible communication device 102 associated with the MSISDN at the time the message 104 is received. Accordingly, the message server 208 can store the message 104 in the message database 210 until it can be delivered.

At operation 2, the MT 304 can register with an MSC/VLR 214 of a legacy network 204 through the exchange of one or more registration messages 306. The MT 304 can be a communication device 102 associated with the MSISDN to which the message 104 was sent. For example, although the MSISDN may have previously been associated with an RCS-compatible communication device 102 connected to the IP network 202, at operation 2 the MSISDN may now be associated with the MT 304 connected to the legacy network 204 due to a SIM swap or other MSISDN transfer operation.

At operation 3, after the MT 304 has registered with the MSC/VLR 214, the MSC/VLR 214 can use MAP to send a ready message 308 to the HLR 216. In some examples, the ready message 308 can be a Ready for Short Message (Ready SM) message. The ready message 308 can indicate that the MT 304 is connected to the legacy network 204 and is able to receive messages 104.

Figure 4:
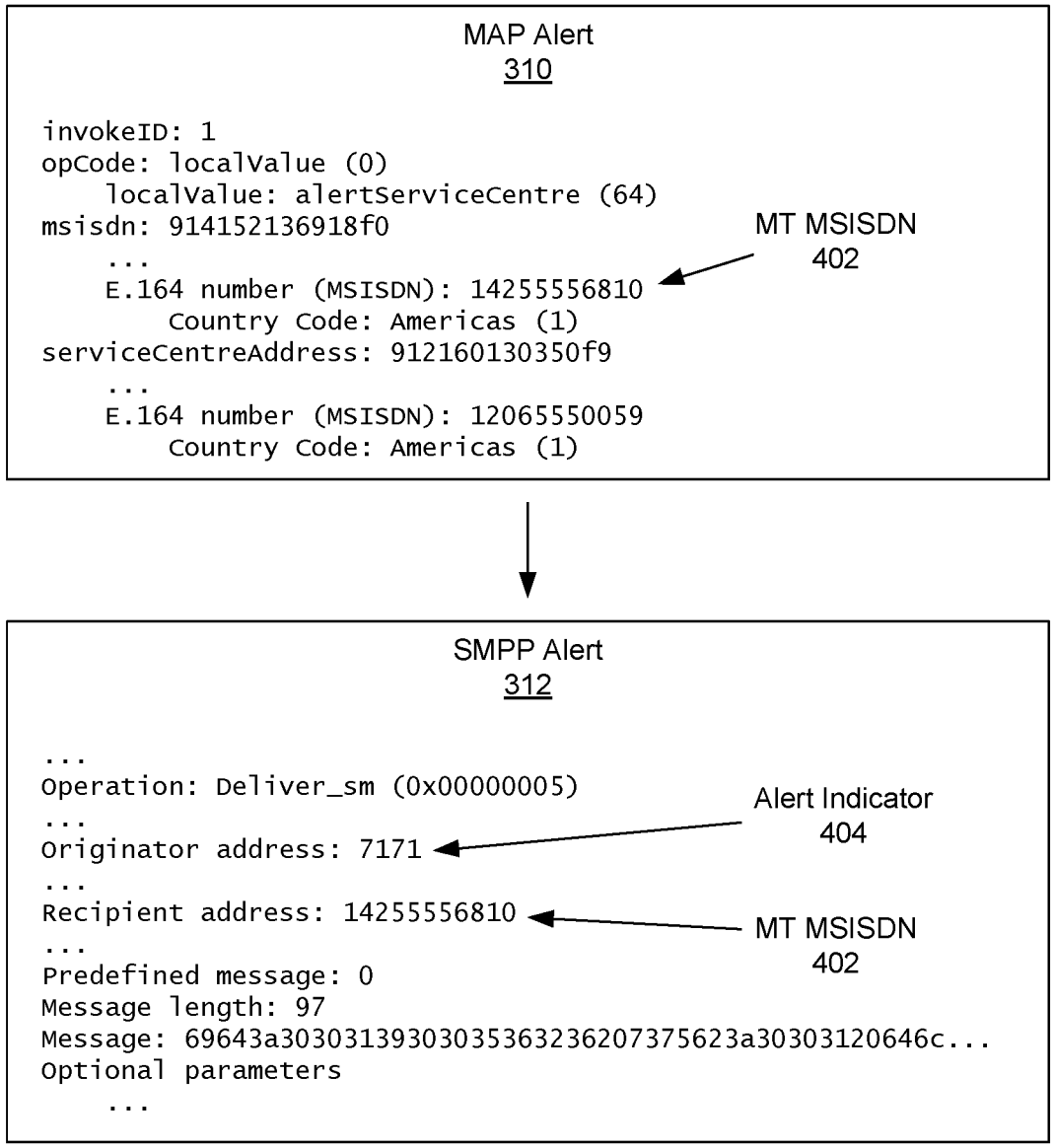
FIG. 4 depicts generation of an example SMPP Alert from an example MAP Alert.

At operation 4, in response to the ready message 308, the HLR 216 can use MAP to send a MAP Alert 310 to the SMSC 212. In some examples, the MAP Alert 310 can be an Alert Service Center (Alert-SC) message. FIG. 4 depicts an example of a MAP Alert 310 message. Among other information, the MAP Alert 310 can identify the MT's MSISDN 402. Receipt of the MAP Alert 310 can indicate to the SMSC 212 that the MT 304 is available to receive messages 104 through the legacy network 204.

As discussed above, an SMSC 212 of a legacy network 204 can exchange information with a message server 208 of an IP network 202 using the SMPP protocol. Because the MAP Alert 310 received by the SMSC 212 at operation 4 is formatted as a MAP message, the SMSC 212 can generate an SMPP Alert 312 as an SMPP message that includes at least some of the information from the MAP Alert 310. The SMSC 212 can accordingly convert and/or translate the MAP Alert 310 into an SMPP Alert 312. FIG. 4 depicts generation of an example SMPP Alert 312 from the example MAP Alert 310. The SMSC 212 can send the converted SMPP Alert 312 to the message server 208 as an SMPP message at operation 5.

The message server 208 can receive the SMPP Alert 312 during operation 5. However, the message server 208 may receive the SMPP Alert 312 as if it were any SMPP-formatted message. As noted above, SMPP is normally used to encapsulate messages 104 sent by originating communication devices 102, and normally includes the contents of such sent messages 104 and associated metadata. Accordingly, the SMSC 212 can encode the SMPP Alert 312 with one or more alert indicators 404 that indicate to the message server 208 that the SMPP Alert 312 is not an SMPP message that encapsulates a message 104, and is instead being sent by the SMSC 212 specifically to alert the message server 208 that the MT 304 has connected through the legacy network 204 and is able to receive messages 104.

The SMPP protocol defines various fields that can be included in an SMPP-formatted message. As shown in FIG. 4, one of these fields can be used to include the MT's MSISDN 402, which the SMSC 212 received in the MAP Alert 310. Normally, other fields of an SMPP-formatted message are used to encapsulate a message 104 or to encode metadata related to that message 104. However, because the SMPP Alert 312 is not an SMPP message that encapsulates a message 104, one or more of these fields can be repurposed to include an alert indicator 404. For example, an alert indicator 404 can be a code such as "7171" or any other number, character, character string, or other value, that signifies to a message server 208 that the SMPP-formatted message is a SMPP Alert 312 being sent by the SMSC 212 specifically to signify that an MT 304 is connected to the legacy network 204 and is able to receive messages 104.

The alert indicator 404 and where it will be encoded within an SMPP-formatted message can be known to both the SMSC 212 and the message server 208, such that the SMSC 212 can encode the alert indicator 404 into an SMPP Alert 312 in a way that the message server 208 can locate and interpret. For example, normally an SMPP message includes an originator address field, such as an MSISDN of an originating communication device 102 that sent a message 104 encapsulated in the SMPP message. However, because the SMPP Alert 312 is not encapsulating a message 104 sent from an originating communication device 102, that originator address field can instead be used to hold an alert indicator 404. In other examples, an alert indicator 404 can be included in any other field defined by the SMPP protocol, such as in a message contents field, in an optional parameter field, and/or in any other field.

After the message server 208 receives an SMPP-formatted message and determines from the alert indictor 404 that it is an SMPP Alert 312, the message server 208 can find the MT's MSISDN 402 included in the SMPP Alert 312 and retrieve any messages 104 for the MT's MSISDN 402 that have been stored in the message database 210, such as the message 104 received at operation 1. The message server 208 can interwork the stored message 104 to be encapsulated into an SMPP message, and send the message 104 to the SMSC 212 using SMPP at operation 6. In some examples, if the stored message 104 was an RCS message, the message server 208 can also convert it to an SMS message or other format compatible with the MT 304 before sending it to the SMSC 212.

At operation 7, the SMSC 212 can interwork the message 104 received from the message server 208 from being encapsulated in the SMPP message into being encapsulated in a MAP message, and send it on to the MSC/VLR 214 using MAP. The MSC/VLR 214 can in turn forward the message 104 to the MT 304 using MAP at operation 8.

Accordingly, although the MT 304 connected to the legacy network 204 may not be able to a SIP message to the message server 208 indicating that it is online and is able to receive stored messages 104, the operations of FIG. 3 can be used to inform the message server 208 that the MT 304 has connected and can receive such stored messages 104.

Following the operations of FIG. 3, the message server 208 can be aware that the MT 304 is connected through the legacy network 204. Accordingly, the message server 208 can forward any new messages 104 addressed to the MT's MSISDN 402 to the MT 304 through the SMSC 212 directly, instead of storing those messages 104 in the message database 210 for later retrieval.

In some examples, if a stored message 104 in the message database 210 includes media, files, or other content that the SMSC 212 is not configured to process or forward on to the MT 304, the message server 208 can retrieve that content from the message database 210 and forward the content to the MT 304 through other servers or elements of the legacy network 204 after it has received the SMPP Alert 312 from the SMSC 212.

Example Architecture

Figure 5:
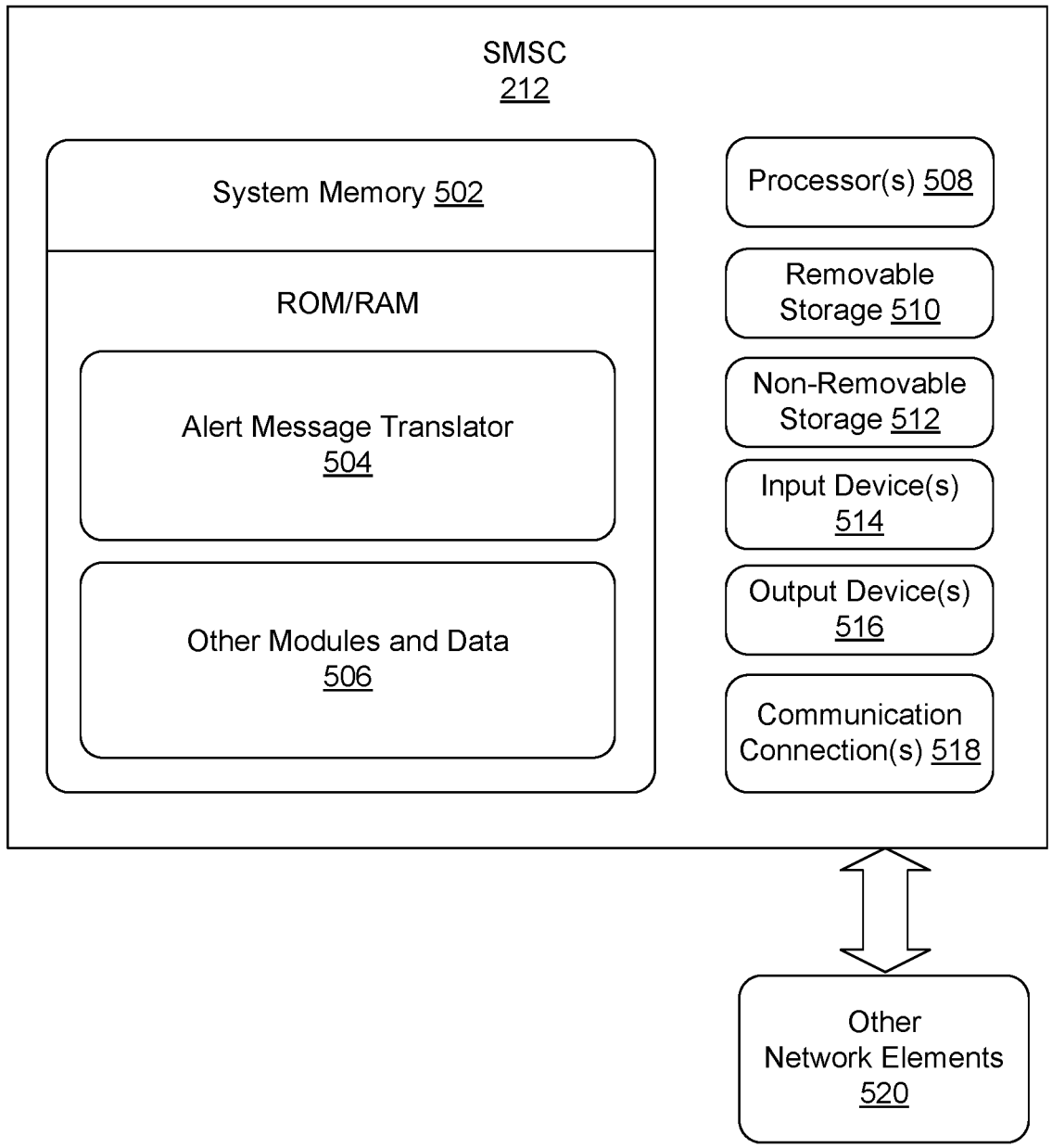
FIG. 5 illustrates an example architecture of an SMSC.

FIG. 5 illustrates an example architecture of an SMSC 212. An SMSC 212 can be, or can run on, a server or other computing device. An SMSC 212 can have a system memory 502. The system memory 502 can store data for the SMSC 212, including an Alert Message Translator 504 and/or other modules and data 506. The SMSC 212 can also include processor(s) 508, removable storage 510, non-removable storage 512, input device(s) 514, output device(s) 516, and/or communication connections 518 for communicating with other network elements 520.

In various examples, system memory 502 can be volatile (such as RAM), nonvolatile (such as ROM, flash memory, etc.), or some combination of the two. Example system memory 502 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The Alert Message Translator 504 can be configured to generate an SMPP Alert 312 based on a MAP Alert 310 received by the SMSC 212 from an HLR 216. The MAP Alert 310 sent by the HLR 216 can indicate an MSISDN 402 of an MT 304 that has connected to a legacy network 204 and is able to receive messages 104. The Alert Message Translator 504 can translate the information in the MAP Alert 310, including the MT's MSISDN 402, into an SMPP Alert 312 that is formatted as an SMPP message. The Alert Message Translator 504 can also include one or more alert indicators 404 within the generated SMPP message that indicate to a message server 208 that the SMPP message is an SMPP Alert 312 signifying that the MT 304 is connected to the legacy network 204 and is able to receive messages 104.

The other modules and data 506 can be utilized by the SMSC 212 to perform or enable performing any action taken by the SMSC 212. The other modules and data 506 can include a platform and applications, and data utilized by the platform and applications.

In some embodiments, the processor(s) 508 can be a central processing unit (CPU), a graphics processing unit (GPU), both CPU and GPU, or other processing unit or component known in the art.

The SMSC 212 can also include additional data storage devices (removable and/or non-removable) such as, for example, magnetic disks, optical disks, or tape. Such additional storage is illustrated in FIG. 5 by removable storage 510 and non-removable storage 512. Computer storage media may include volatile and nonvolatile, removable and non-removable media implemented in any method or technology for storage of information, such as computer readable instructions, data structures, program modules, or other data. System memory 502, removable storage 510 and non-removable storage 512 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the SMSC 212. Any such computer-readable storage media can be part of the SMSC 212. In various examples, any or all of system memory 502, removable storage 510, and non-removable storage 512, store programming instructions which, when executed, implement some or all of the above-described operations of the SMSC 212.

In some examples, the SMSC 212 can also have input device(s) 514, such as a keyboard, a mouse, a touch-sensitive display, voice input device, etc., and/or output device(s) 516 such as a display, speakers, a printer, etc. These devices are well known in the art and need not be discussed at length here.

The SMSC 212 can also contain communication connections 518 that allow the SMSC 212 to communicate with other network elements 520, such as a message server 208, an MSC/VLR 214, and/or an HLR 216. For example, a communication connection 518 can allow the SMSC 212 to communicate with a message server 208 via SMPP. As another example, a communication connection 518 can allow the SMSC 212 to communicate with an MSC/VLR 214 and/or an HLR 216 via MAP.

FIG. 6 illustrates an example architecture of a message server 208. An RCS server 208 can be, or can run on, a server or other computing device. A message server 208 can have a system memory 602. The system memory 602 can store data for the message server 208, including a communication device tracker 604, a message store and forward module 606, a message database 210, an SMPP message interpreter 608, and/or other modules and data 610. The message server 208 can also include processor(s) 612, removable storage 614, non-removable storage 616, input device(s) 618, output device(s) 620, and/or communication connections 622 for communicating with other network elements 624.

In various examples, system memory 602 can be volatile (such as RAM), nonvolatile (such as ROM, flash memory, etc.), or some combination of the two. Example system memory 602 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The communication device tracker 604 can obtain and maintain information about individual communication devices 102, including MSISDNs and/or other identifiers associated with the communication devices 102, presence information indicating whether the communication devices 102 are connected to the telecommunication network 106, compatibility information indicating whether the communication devices 102 are RCS-compatible, information about individual messaging sessions between communication devices 102, and/or any other information. In some examples, the communication device tracker 604 can use SIP messages exchanged with communication devices 102 connected to the IP network 202 to obtain such information. In other examples, the communication device tracker 604 can use information received in an SMPP Alert 312 to determine that a communication device 102 is connected to a legacy network 204 and is able to receive messages 104 through the legacy network 204.

The message store and forward module 606 can determine whether to forward a new message 104 to a terminating communication device 102 or to store the new message 104 in the message database 210 until it can be forwarded to a terminating communication device 102. For example, the message store and forward module 606 can review presence information maintained by the communication device tracker 604 to determine if a communication device 102 associated with a message's destination MSISDN is connected to the telecommunication network 106 and is able to receive messages 104. If so, the message 104 can be forwarded on through the telecommunication network 106 toward that communication device 102. However, if the message store and forward module 606 determines that no communication device 102 associated with the message's destination MSISDN is available to receive the message 104, the message 104 can be stored in the message database 210. Once the message server 208 receives new information indicating that a communication device 102 associated with the message's destination MSISDN is available to receive the message 104, such as a SIP message including new RCS presence information or information received in a an SMPP Alert 312, the message store and forward module 606 can retrieve the message 104 from the message database 210 and forward the message 104 on through the telecommunication network 106 toward that communication device 102

As discussed above, the message database 210 can store messages 104 received by the message server 208 that are initially found to be undeliverable. Once the message server 208 determines that the messages 104 can be delivered, they can be retrieved from the message database 210 and forwarded to their destinations. In some examples, the message database 210 can be a part of the message server 208 as shown in FIG. 6. However, in other examples the message database 210 can be, or be stored in, an external network element as shown in FIG. 2.

The SMPP message interpreter 608 can analyze an SMPP message received by the message server 208 to determine if it is an SMPP Alert 312 or another type of SMPP message, such as an SMPP message encapsulating a message 104 sent by an originating communication device 102. The SMPP message interpreter 608 can determine if the SMPP message includes an alert indicator 404 that signifies that the SMPP message is an SMPP Alert 312 being sent to inform the message server 208 that a communication device 102 associated with a particular MSISDN 402 is connected through a legacy network 204 and is able to receive messages 104. If the SMPP message interpreter 608 determines that the SMPP message includes such an alert indicator 404, it can inform the communication device tracker 604 and/or the message store and forward module 606 so that any messages 104 that have been stored in the message database 210 for that MSISDN 402 can be retrieved and sent through the legacy network 204 to the communication device 102 associated with the MSISDN 402.

The other modules and data 610 can be utilized by the message server 208 to perform or enable performing any action taken by the message server 208. The other modules and data 610 can include a platform and applications, and data utilized by the platform and applications.

In some embodiments, the processor(s) 612 can be a central processing unit (CPU), a graphics processing unit (GPU), both CPU and GPU, or other processing unit or component known in the art.

The message server 208 can also include additional data storage devices (removable and/or non-removable) such as, for example, magnetic disks, optical disks, or tape. Such additional storage is illustrated in FIG. 6 by removable storage 614 and non-removable storage 616. Computer storage media may include volatile and nonvolatile, removable and non-removable media implemented in any method or technology for storage of information, such as computer readable instructions, data structures, program modules, or other data. System memory 602, removable storage 614 and non-removable storage 616 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the message server 208. Any such computer-readable storage media can be part of the message server 208. In various examples, any or all of system memory 602, removable storage 614, and non-removable storage 616, store programming instructions which, when executed, implement some or all of the above-described operations of the message server 208.

In some examples, the message server 208 can also have input device(s) 618, such as a keyboard, a mouse, a touch-sensitive display, voice input device, etc., and/or output device(s) 620 such as a display, speakers, a printer, etc. These devices are well known in the art and need not be discussed at length here.

The message server 208 can also contain communication connections 622 that allow the message server 208 to communicate with other network elements 624, such as an IMS core 206, an external message database 210, and/or an SMSC 212. For example, a communication connection 622 can allow the message server 208 to communicate with an SMSC 212 via SMPP. As another example, a communication connection 622 can allow the message server 208 to communicate with an external message database 210 via HTTP, FTP, or any other file transfer protocol. As yet another example, a communication connection 622 can allow the message server 208 to communicate with the IMS core 206, or communication devices 120 via the IMS core 206, via SIP.

Example Operations

Figure 7:
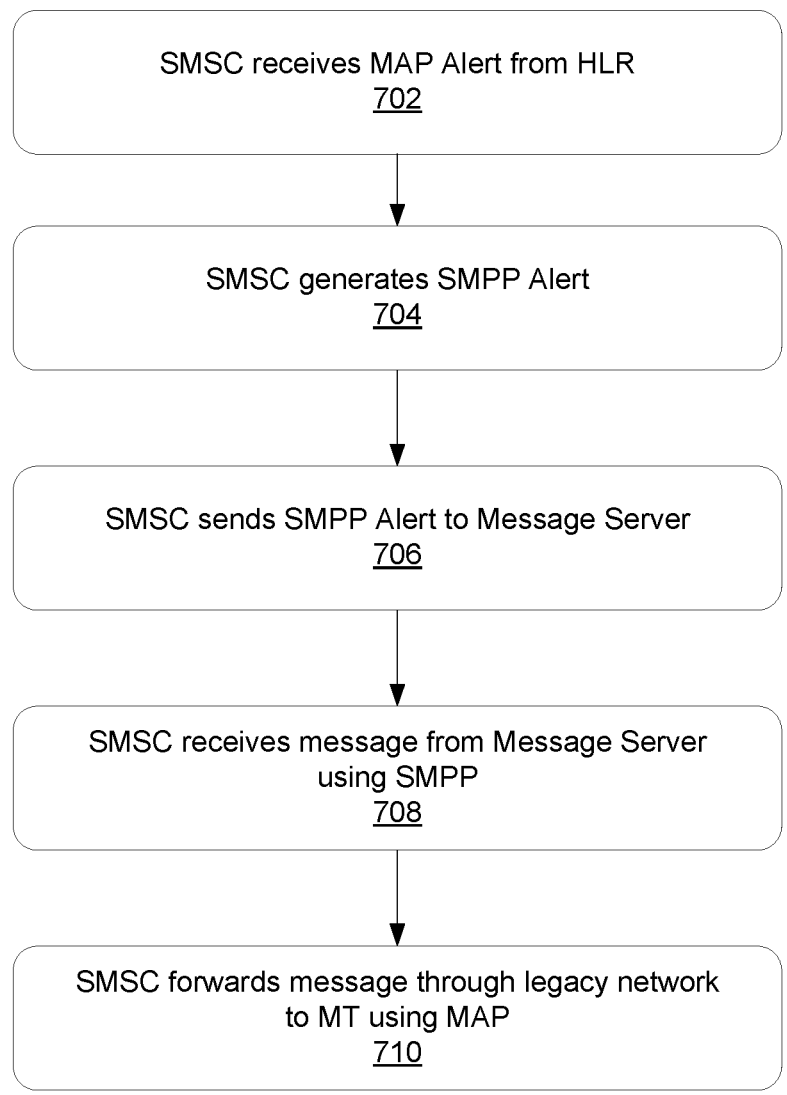
FIG. 7 depicts a flow chart of an example process that an SMSC can use to indicate to a message server of an IP network that an MT has connected to a legacy network, and to forward any messages to the MT that the message server had stored.

FIG. 7 depicts a flow chart of an example process that an SMSC 212 can use to indicate to a message server 208 that an MT 304 has connected to the legacy network 204, and to forward any messages 104 to the MT 304 that the message server 208 had stored.

At block 702, the SMSC 212 can receive a MAP Alert 310 as a MAP message from an HLR 216. In some examples, the MAP Alert 310 can be an Alert-SC message. The MAP Alert 310 can include an MSISDN 402 of an MT 304 that has connected to the legacy network 204, and can indicate that the MT 304 is available to receive messages 104 through the legacy network 204.

At block 704, the SMSC 212 can use information in the MAP Alert 310 to generate an SMPP Alert 312. The SMPP Alert 312 can be formatted as an SMPP message, and can include the MT's MSISDN 402 received in the MAP Alert 310. The SMSC 212 can also include an alert indicator 404 in one or more of the SMPP message fields in the SMPP Alert 312. As discussed above, the alert indicator 404 can be a code or other value that indicates to a message server 208 of an IP network 202 that the MT 304 is associated with the MSISDN 402 and is available to receive messages 104 through the legacy network 204.

At block 706, the SMSC 212 can send the SMPP Alert 312 to a message server 208 of an IP network 202 using the SMPP protocol. Although the SMPP Alert 312 can be sent as if it were any other SMPP message, the alert indicator 404 encoded into the SMPP Alert 312 can signify to the message server 208 that the MT 304 is available to receive messages 104 addressed to the MSISDN 402 specified in the SMPP Alert 312.

At block 708, the SMSC 212 can receive a message 104 from the message server 208 in response to the SMPP Alert 312. For example, the message 104 can be a message 104 that was addressed to the MT's MSISDN 402, but had been stored by the message server 208 in a message database 210 until it was retrieved and sent to the SMSC 212 based on the message server's receipt of the SMPP Alert 312. The message 104 can be received by the SMSC 212 as an SMPP message that encapsulates the message 104.

At block 710, the SMSC 212 can use MAP to forward the message 104 through the legacy network 204 toward the MT 304. For example, the SMSC 212 can send the message 104 to an MSC/VLR 214 to which the MT 304 is connected, so that the MSC/VLR 214 can pass the message 104 on to the MT 304. In some examples, if the SMSC 212 is not aware of which MSC/VLR 214 to send the message 104 to, the SMSC 212 can request that information from the HLR 216. Because the SMSC 212 can have received the message 104 in an SMPP message at block 708, at block 710 the SMSC 212 can interwork the message 104 from being encapsulated in the SMPP message to being encapsulated in a MAP message that can be forwarded through the legacy network 204.

Figure 8:
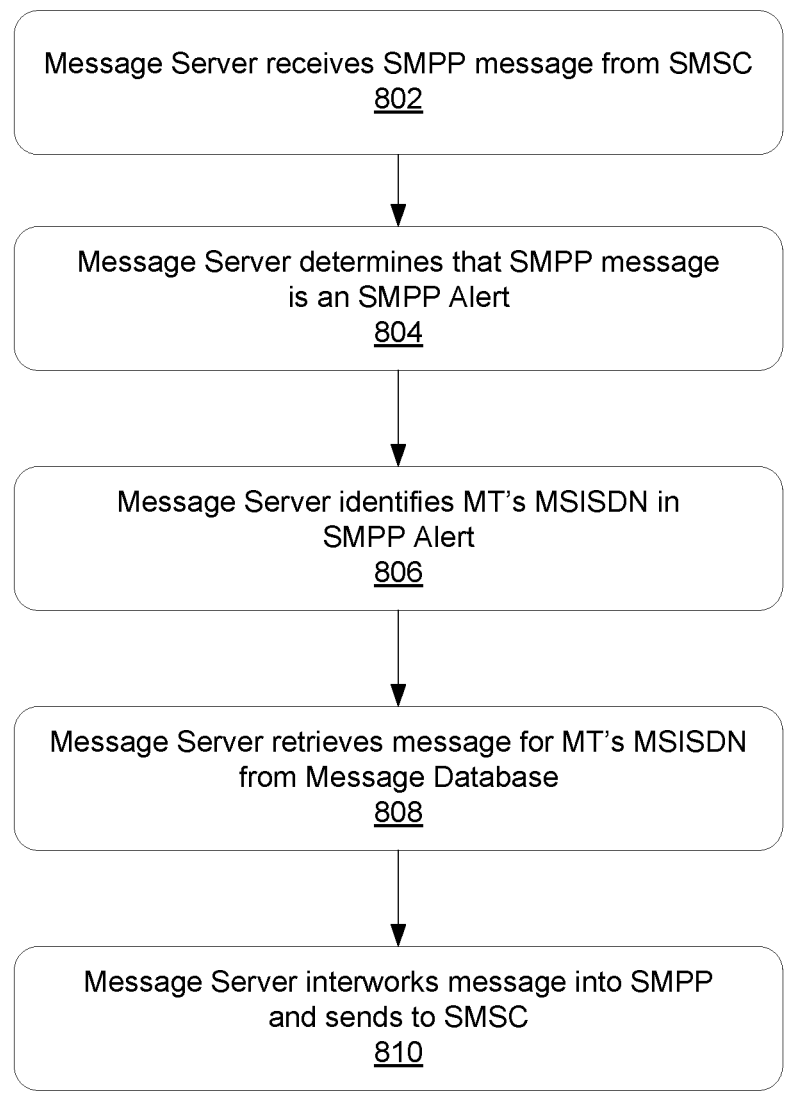
FIG. 8 depicts a flow chart of an example process by which a message server of an IP network can determine that a message stored in a message database can be delivered to a terminating communication device that has connected to a legacy network.

FIG. 8 depicts a flow chart of an example process by which a message server 208 of an IP network 202 can determine that a message 104 stored in a message database 210 can be delivered to a terminating communication device 102 that has connected to a legacy network 204.

At block 802, the message server 208 can receive an SMPP message from an SMSC 212.

At block 804, the message server 208 can analyze the SMPP message to determine if the SMPP message is an SMPP Alert 312. Although a SMPP Alert 312 may be formatted like any other SMPP message, it can include one or more alert indicators 404 that signify that it is a SMPP Alert 312 being sent to inform the message server 208 that an MT 304 associated with a particular MSISDN 402 has connected to the legacy network 204 and is available to receive messages 104. For example, the SMPP message can include an alert indicator 404, such as a code or other predefined value, in one or more SMPP fields that the message server 208 recognizes as identifying the SMPP message as an SMPP Alert 312.

At block 806, the message server 208 can identify the MT MSISDN 402 included in the SMPP Alert 312.

At block 808, the message server 208 can retrieve a message 104 addressed to that MT MSISDN 402 from the message database 210. The message 104 may have been stored in the message database 210 at a previous time at which the message server 208 received the message 104 but was unable to find an available communication device 102 that was associated with the MSISDN 402 to which the message 104 is addressed.

At block 810, the message server 208 can interwork the message 104 into an SMPP format, such as encapsulating the message 104 into an SMPP message, and send the message 104 to the SMSC 212. In some examples, when the retrieved message 104 is an RCS message, the message server 208 can convert the message to an SMS message or any other format before sending it to the SMSC 212 using SMPP. The SMSC 212 can then forward the message 104 on to the MT 304 through the legacy network 204.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
receiving, by a message server of an Internet Protocol (IP) network, a Short Message Peer-to-Peer (SMPP) message from a Short Message Service Center (SMSC) of a legacy network;
identifying, by the message server, an identifier of a communication device in the SMPP message;
determining, by the message server, that the SMPP message is an alert message based on a presence of an alert indicator in the SMPP message, wherein the alert indicator signifies that the communication device is available to receive messages through the legacy network;
retrieving, by the message server, one or more messages from a message database that are addressed to the identifier; and
sending, by the message server, the one or more messages to the SMSC.

2. The method of claim 1, wherein the message server sends the one or more messages to the SMSC at least in part by encapsulating the one or more messages into one or more additional SMPP messages, and sending the one or more additional SMPP messages to the SMSC.

3. The method of claim 1, wherein the message server is a Rich Communication Services (RCS) server.

4. The method of claim 3, wherein:
the one or more messages are RCS messages, and
the message server sends the one or more messages to the SMSC at least in part by converting the RCS messages to Short Message Service (SMS) messages.

5. The method of claim 1, wherein the alert indicator is a predefined value included in at least one field of the SMPP message.

6. The method of claim 5, wherein the at least one field is an originator address field.

7. The method of claim 1, wherein the message server stored the one or more messages in the message database based on a determination that the communication device was not available to receive messages when the message server received the one or more messages.

8. The method of claim 1, wherein the identifier is a Mobile Station International Subscriber Directory Number (MSISDN) associated with the communication device.

9. The method of claim 1, further comprising:
receiving, by the message server, one or more subsequent messages for the communication device; and
forwarding, by the message server, the one or more subsequent messages to the communication device via the SMSC in response to determining that the SMPP message is the alert message.

10. The method of claim 1, further comprising forwarding, by the message server, content from at least one of the one or more messages to the communication device via an alternate server of the legacy network when the SMSC is not configured to process or forward the content.

11. A message server of an Internet Protocol (IP) network, comprising:
one or more processors; and
memory storing computer-executable instructions that, when executed by the one or more processors, cause the message server to perform operations comprising:
receiving a Short Message Peer-to-Peer (SMPP) message from a Short Message Service Center (SMSC) of a legacy network;
identifying an identifier of a communication device in the SMPP message;
determining that the SMPP message is an alert message based on a presence of an alert indicator in the SMPP message, wherein the alert indicator signifies that the communication device is available to receive messages through the legacy network;
retrieving one or more messages from a message database that are addressed to the identifier; and
sending the one or more messages to the SMSC.

12. The message server of claim 11, wherein the computer-executable instructions cause the message server to send the one or more messages to the SMSC at least in part by encapsulating the one or more messages into one or more additional SMPP messages, and send the one or more additional SMPP messages to the SMSC.

13. The message server of claim 11, wherein the message server is a Rich Communication Services (RCS) server, the one or more messages are RCS messages, and the computer-executable instructions cause the message server to send the one or more messages to the SMSC at least in part by converting the RCS messages to Short Message Service (SMS) messages.

14. The message server of claim 11, wherein the alert indicator is a predefined value included in at least one field of the SMPP message.

15. The message server of claim 11, wherein the message server stored the one or more messages in the message database based on a determination that the communication device was not available to receive messages when the message server received the one or more messages.

16. One or more non-transitory computer-readable media storing computer-executable instructions that, when executed by one or more processors of a message server of an Internet Protocol (IP) network, cause the message server to perform operations comprising:

receiving a Short Message Peer-to-Peer (SMPP) message from a Short Message Service Center (SMSC) of a legacy network;

identifying an identifier of a communication device in the SMPP message;

determining that the SMPP message is an alert message based on a presence of an alert indicator in the SMPP message, wherein the alert indicator signifies that the communication device is available to receive messages through the legacy network;

retrieving one or more messages from a message database that are addressed to the identifier; and sending the one or more messages to the SMSC.

17. The one or more non-transitory computer-readable media of claim 16, wherein the computer-executable instructions cause the message server to send the one or more messages to the SMSC at least in part by encapsulating the one or more messages into one or more additional SMPP messages, and send the one or more additional SMPP messages to the SMSC.

18. The one or more non-transitory computer-readable media of claim 16, wherein the message server is a Rich Communication Services (RCS) server, the one or more messages are RCS messages, and the computer-executable instructions cause the message server to send the one or more messages to the SMSC at least in part by converting the RCS messages to Short Message Service (SMS) messages.

19. The one or more non-transitory computer-readable media of claim 16, wherein the alert indicator is a predefined value included in at least one field of the SMPP message.

20. The one or more non-transitory computer-readable media of claim 16, wherein the message server stored the one or more messages in the message database based on a determination that the communication device was not available to receive messages when the message server received the one or more messages.

* * * * *